United States Patent [19]

Williams

[11] E Re. 29,939

[45] Reissued Mar. 20, 1979

[54] SPECTROMETER SYSTEM

[75] Inventor: David T. Williams, Gainesville, Fla.

[73] Assignee: Board of Regents, State of Florida, Tallahassee, Fla.

[21] Appl. No.: 609,294

[22] Filed: Sep. 2, 1975

Related U.S. Patent Documents

Reissue of:

[64] Patent No.: 3,756,721
Issued: Sep. 4, 1973
Appl. No.: 232,053
Filed: Mar. 6, 1972

U.S. Applications:

[63] Continuation-in-part of Ser. No. 59,456, Jul. 30, 1970, abandoned.

[51] Int. Cl.[2] ..... G01J 3/04; G01J 3/42

[52] U.S. Cl. ..... 356/329

[58] Field of Search ..... 356/74–84, 356/88, 89, 93–101

[56] References Cited

U.S. PATENT DOCUMENTS

| | | | |
|---|---|---|---|
| 2,823,577 | 2/1958 | Machler | 356/82 |
| 3,482,105 | 12/1969 | Hutzler | 356/97 |
| 3,518,002 | 6/1970 | Barringer et al. | 356/97 |
| 3,520,614 | 7/1970 | Goldstein | 356/97 |
| 3,594,083 | 7/1971 | Barringer | 356/83 |

OTHER PUBLICATIONS

Shaklee et al., Applied Optics, vol. 9, No. 3, Mar. 1970 pp. 627–632.

Williams et al., Applied Optics vol. 9, No. 7, Jul. 1970, pp. 1597–1605.

Harris, "Design of a Feedback Circuit for Controlling the Amplitude of a Mechanical Oscillator," Master's Thesis, University of Florida, 1968.

Williams et al., "Molecular Correlation Spectrometry," *Applied Optics,* vol. 7, No. 4, Apr. 1968, pp. 607–616.

Bonfiglioli et al., Applied Optics, vol. 6, No. 3, Mar. 1967, pp. 447–455.

*Primary Examiner*—F. L. Evans

*Attorney, Agent, or Firm*—George H. Baldwin; Arthur G. Yeager

[57] ABSTRACT

A wobbling single slit is provided as the entrance slit of a spectrometer which rectilinearly reciprocates at a constant amplitude, such amplitude being selectively adjustable. A control signal is obtained from a circuit that oscillates the slit for controlling the frequency and phase of the ac signal component detected and amplified from the detector after the superposed dc detected signal component is separated from the ac signal component.

23 Claims, 3 Drawing Figures

SPECTROMETER SYSTEM

Matter enclosed in heavy brackets [ ] appears in the original patent but forms no part of this reissue specification; matter printed in italics indicates the additions made by reissue.

The invention described herein was made in the course of work under a grant or award from the Department of Health, Education and Welfare.

This application is a continuation-in-part of application Ser. No. 59,456, filed July 30, 1970, now abandoned.

1. Field of the Invention

This invention relates to spectroscopy and more particularly to an improved spectrometer system for obtaining and analyzing spectrometric data with increased sensitivity and precision of spectral analysis of from two to four or more orders of magnitude than normally attainable by use of conventional spectrometer systems.

2. Description of the Prior Art

Various spectrometer systems have been proposed by many others among which are the following: A. Barringer, Paper 67/196, 60th Annual Air Pollution Control Association meeting; B. Williams, et al., "Molecular Correlation Spectrometry". Appl. Opt. 7 (4) 607-16 (1968); C. "Design of a Feedback circuit for controlling the amplitude of a mechanical oscillator", Harris, Master's thesis, University of Florida, (1968); D. Giese et al, Appl. Spectroscopy 9, 78-96 (1955); E. Collier et al, J. Appl. Chem. 6 495-510 (1956); F. Pemsler, RSI 28 (4) 274 and 5 (1957); G. Olson et al, Analyt. Chem 32 (3) 370-373 (1960); H. Balslev, Phys. Rev. 143 (2) 636-647 (1966); I. Arumu et al, RSI 37 (12) 1696-1698 (1966); J. Bonfiglioli et al, Appl. Opt. 3 (12) 1417-1424 (1965); K. Bonfiglio et al, Appl. Opt. 6 (3) 447-455 (1967); L. Gilgore et al, RSI 38, 1535 and 6 (1967); M. Overend et al, Appl. Opt. 6 (3) 457-466 (1967); N. Perregaux et al, Appl. Opt. 7 (10) 2031-2035 (1968); and O. Stauffer et al, Appl. Opt. 7 (1) 61-65 (1968).

References A, C, L. N. and O. above describe different techniques and arrangements of moving the radiant energy beam in the spectrometer system and are in general more directly related to the present invention than the other references cited hereinabove.

In principle the present invention relates essentially to an improved spectrometer system for comparing the intensity of light of a particular wavelength with the intensity of light of wavelengths immediately adjacent to that wavelength in the same spectrum. In that sense there is a resemblance of this system to the general art of light "choppers" in which two different sources of light either of the same or of different wavelengths may be compared many times a second as well known in the field of infrared spectroscopy. Another arrangement is disclosed by Barringer et al in Reference A above. In their system light from a continuous source is introduced through some known or assumed length L of a path containing a concentration c of a as which is to be measured. The light is dispersed in the conventional manner in the spectrometer so as to produce an array of more or less overlapping images of the entrance slit in the colors characteristic of the light source as modified by absorption due to the gas in the amount cL. Their system has a correlation mask set at the focal plane of the spectrometer, which mask is an array of slits of spacing corresponding to the absorption spectrum of the absorbing gas to be investigated. The spectrum is oscillated torsionally to displace the entrance slit image from side to side with respect to the mask, across the point of register. At the point of register, the light transmitted through the mask, and thence to the light detector, has a minimum value of a magnitude that depends on the product $cL\mu$ where $\mu$ is a function of the various absorption coefficients of the gas at the positions of the slits in the mask. If the frequency of the motion of the spectrum relative to the mask is n, then the signal will be increased at all points out of register, and an ac signal will be generated of a frequency pn where p is some whole number less than 10. This ac signal can be amplified by use of a tuned amplifier; and the amplified ac signal, when the mean output is maintained constant by use of AGC, will result in a measure of the quantity cL of the gas. Barringer et al assert that their arrangement has some degree of specificity in the detection of the gas corresponding to the mask, although the arrangement is designed to detect only one gas at a time, other gases requiring the use of other differently slitted masks, which normally can only be installed at the factory.

SUMMARY OF THE INVENTION

In accord with various aspects of the invention a wobbling slit means in the form of a single slit in a movable carrier is provided in the radiant energy path between the radiant energy source and the spectrometer. A photomultiplier detector and an absorption cell containing a medium to be investigated communicate with the radiant energy path between the spectrometer and detector, the detector including a photomultiplier tube having grid wires. The wobbling slit is disposed in noninterferring relation to the grid wires of the tube. Means are provided for rectilinearly reciprocating the carrier which includes circuit means for maintaining the amplitude of the reciprocating motion of frequency constant and selectively adjustable means for altering the amplitude. The detector receives the radiant energy after passage through the absorbing medium to be investigated and converts the received radiant energy into a signal. A tune phased lock-in amplifier means receives the signal and converts same into a first ac signal of selected frequency and a dc signal, the first and dc signals being coupled to a potentiometric recorder to record the ratio of the first signal to the dc signal. The circuit means also provides a control signal representative of the frequency and phase of the oscillating slit motion to the amplifier means for use in rectifying the first signal.

The present invention provides an improved spectrometer system in which the motion of the spectrum is provided by a single slit wobbling mask set in front of and functioning as the entrance slit of the spectrometer, and the received ac signal with superposed dc signal is separated and the ac component thereafter amplified in a tuned amplifier and divided by the dc component, thereby rendering the ratio output of the system to be independent of the fluctuations in the intensity of the radiant energy source.

The primary advantages of the present invention are that a single slit is used, rather than an array of slits, as the mask; a wobbling system is employed to move the slit; the amplitude of oscillation of the wobbling system is adjusted at will, and provided to be constant, once set; the ac signal from the photomultiplier detector is separated from the dc signal, and one particular frequency is amplified by use of a tuned amplifier, the amplifier output being rectified by use of a synchronous switching circuit, and then divided by the dc component of the original photomultiplier detector signal, by use of a potentiometric recorder whereby the ratio of the recorded output is independent of the intensity and drift of the radiant energy source; the wobbling slit is mounted at the position of the entrance slit of the spectrometer in a manner as to render unaltered the operation of the spectrometer, and to permit use of the spectrometer, after suitable switching adjustments, either as a conventional transmission spectrometer or a derivative spectrometer; and the location of the wobbling slit at the position of the entrance slit maintains the light pattern due to the exit slit stationary with relation to the grid wires in the photomultiplier tube of the detector, which eliminates a large zero signal and instrument adjustments that otherwise would be produced if the wobbling slit were positioned as the exit slit of the spectrometer, for example.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing in which:

DESCRIPTION OF THE PREFERRED EMBODIMENT

Figure 1:
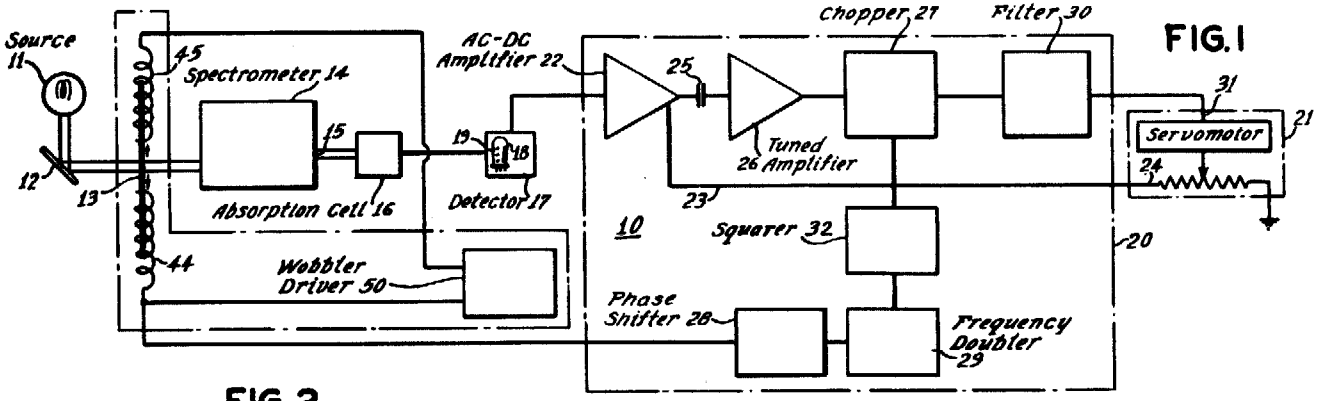
FIG. 1 is a diagrammatic view of the spectrometer system in accord with the present invention.
Figure 2:
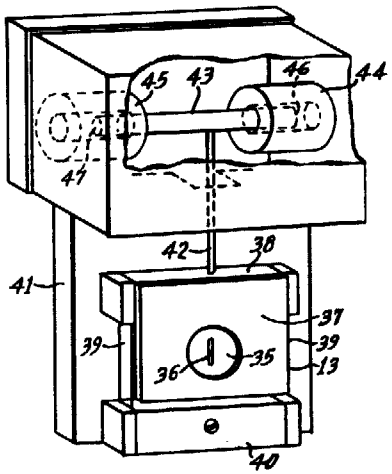
FIG. 2 is a pictorial view, partly broken away, of the wobbling entrance slit for the spectrometer of FIG. 1.

Referring now more particularly to the drawing of FIG. 1, the spectrometer system is generally indicated by reference numeral 10 and includes a radiant energy source 11 and a mirror 12 reflecting the radiant energy through a wobbling slit means 13 and into spectrometer 14 which may be of the type of a small Jarrell-Ash quarter-meter grating instrument, model 82–405, marketed under the name "Minichromator", manufactured by Jarrell-Ash Co. of Waltham, Mass. The radiant energy passes through the slit, hereinafter more fully described in conneith FIG. 2, which serves as or functions as the entrance slit of the spectrometer 14. The radiant energy is dispersed by the spectrometer 14 prior to passage thereof out the exit slit 15 thereof into the absorption cell 16 containing a medium to be investigated, such medium normally being gaseous with pollutants therein.

The radiant energy not absorbed, exists from cell 16, is detected by a detector 17, and is thereafter analyzed. The detector 17 includes a photomultiplier tube 18, or the like, which normally includes a plurality of grid wires 19 therein. Since the exit slit 15 of the spectrometer 14 is stationary, the radiant energy pattern is stationary with respect to the grid wires 19 in the tube 18. Movement or chopping of the radiant energy pattern would otherwise cause radiant energy interference between the grid wires and a movable exit slit, for examples, if the wobbling slit were placed as the exit slit of the spectrometer, as disclosed in "Design of a Feedback Circuit for Controlling the Amplitude of a Mechanical Oscillator", William T. Harris, Master's Thesis, University of Florida, 1968, which would produce a large zero signal from the photomultiplier tube 18 due to the interrelation of such wobbling exit slit with respect to the photomultipler grid wires.

The signal from the detector 17, consisting of a dc signal with the ac signal superposed, is supplied to a phase lock-in amplifier means indicated at 20 with a coupled potentiometric recorder 21 to make a record proportional to the ratio of the ac signal to the dc signal. By appropriate studies of the particular record various characteristics of the medium under investigation in the cell 16 may be determined by methods and means well known to those skilled in the art.

The signal from detector 17 is amplified by ac-dc amplifier 22 with the dc signal component being applied through line 23 to the potentiometric recorder 21 reference voltage input 24. The ac signal component is passed through a coupling capacitor 25 to a tuned amplifier 26 which may be tuned to the same frequency as that of the wobbling slit means, hereinafter more particularly described, or to a harmonic thereof. If the frequency of the tuned amplifier 26 is the fundamental of the frequency of the wobbling slit means, the system 10 functions as a first-derivative spectrometer system. However, when the tuned frequency is twice the frequency of such wobbling slit means, the system 10 functions as a second-derivative spectrometer having sensitivities and capabilities of more accurately identifying, for example, various pullutants in a sample to be investigated, of from two to four or more orders of magnitude more sensitivity that that normally achievable.

The tuned ac signal component is fed into a chopper 27, also tuned to the second harmonic, which rectifies the ac signal component supplied thereto, chopper 27 being controlled by a control signal from wobbling slit means 13 through a phase shifter 28 to adjust the phase of the control signal and to a frequency doubler 29 and squarer 32 to develop the proper control signal or pulses which activate chopper 27. The output signal from chopper 27 is filtered by filter 30 before such signal is coupled to the input 31 of potentiometric recorder 21.

The wobbling slit means is seen to include a carrier 35 carrying a single slit 36 which functions as the entrance slit of the spectrometer 14. The carrier 35 is attached to a support 37, support 37 being rigidly connected to a movable member 38. A pair of flat leaf springs 39 are clamped to the spring base 40 as illustrated and are also clamped to movable member 38 spaced above base 40. Base 40 is rigidly affixed to a stationary plate 41 which has an opening (not shown) therethrough for the passage of the radiant energy from source 11 and mirror 12 therethrough and through entrance slit 36 of the spectrometer 14. A rod 42 is connected between member 38 and an elongated permanent magnet 43 with a pair of solenoids 44 and 45 encircling respective ends 46 and 47 of magnet 43.

It is thus seen that wobbling slit means 13 includes a carrier 35 having a single slit 36 therethrough and means for oscillating such carrier for reciprocating motion, such latter means herein shown as including the pair of leaf springs 39, as well as the other structural components, as described in connection with FIG. 1 together with a wobbler driver circuit 50 as shown specifically in FIG. 3.

When the wobbler driver circuit 50 is inoperative, the pair of leaf psrings 39 maintain the slit 36 in a null position with the respective poles 46 and 47 of the bar magnet 43 being in the center of the solenoid coils 44 and 45. Upon displacement of the magnet 43 further into either coils 44 and 45, the leaf springs 39 tend to retard such displacement and exert restoring forces substantially proportional to the displacement.

Assume that solenoid coil 44 is the driving coil and that this coil causes magnet 43 to be driven further into solenoid pick-up coil 45, the movement of magnet 43 also moving the coupled slit carrier 35. A current is induced into coil 45 by the movement of the magnet 43 axially thereinto which essentially is in the form of a sine wave that is coupled through capacitor 52 to the base 53 of tranistor 54 with proper bias voltage being supplied from source 55 through resistors 68 and 69. The transistor 54 is connected essentially as a common-emitter circuit, generally analogous to a grounded-cathode amplifier, which amplifies the signal applied to base 53 without appreciable distortion. The amplified signal is coupled from collector 57 through capacitor 58 to the base 59 of another transistor 60 for power amplification of the signal which is in turn coupled from collector 61 to driving coil 44.

However, the springs 39 have heretofore restored the magnet to its null position or slightly beyond with the magnet 43 being within the coil 44 to a greater extent than at the null position. The current in the coil 44 from collector 61 of transistor 60 again drives the magnet 43 back into coil 45 and the oscillation and circuit operation continues as previously described.

The bias at the base 59 of transistor 60 is variable by employing a potentiometer 65 which is adjusted to chop the signal supplied to the base 59 either at saturation or cut-off of transistor 60. The current transmitted through the collector 61 of transistor 60 into the solenoid coil 44 is a strong function of the amplitude of the wobbler slit peak to peak displacement, so that when potentiometer 65 is so adjusted and set, the amplitude of the wobbler slit is substantially constant and is unchanging with respect to time. The circuit details of FIG. 3 may be modified without departing from the spirit or scope of this invention by persons skilled in the art, it being important to supply a non-linear circuit element in such wobbler driver 50 to control the amplitude of oscillation of the wobbler slit.

The spectrometer system as described above does resemble the systems of Barringer and Harris set forth hereinabove, but the similarities are quite superficial, and the prior art systems do not achieve the results obtained by the instant invention nor the many advantages afforded thereby. The most important distinction is the use of a single wobbler entrance slit 13 in the instant system without the use of any type of correlation mask as shown and described in Barringer and Harris.

The single wobbler entrance slit 13 in accord with this invention rectilinearly reciprocates and causes a sinusoidal variation of the wavelength of the light detected by the photomultiplier tube 18. Light choppers used in conventional infrared technology usually compare a pair of independent light sources, which are very much more independent than the light of wavelengths immediately proximate in the spectrum, as employed in the instant system. When two independent sources are compared by use of the conventional light chopper systems, the observed differences in such sources have magnitudes that show a random distribution about a means value, the observed differences being somewhat more random than the largest fluctuation or variant of either of the two sources. However in the spectrometer system in accord with this invention in using a single wobbler entrance slit 13, the differences being measured are the differences in the transmission of closely neighboring wavelengths in a given spectrum of the light after passage through the absorption cell 16, and the differences are substantially independent of fluctuations or variations in the light source 11, or of the transmission characteristics of the absorbing medium through which the beam passes. Any fluctuation or variation in the intensity of the light source 11, which may be caused by voltage fluctuations, source depletion, etc., or of the transmission characteristics will effect all of the entire wavelengths of light being observed at the same time. Thus, the measured difference is free of such variations or fluctuations as would be observed if the spectral regions compared were wholly independent of each other.

The use of a single wobbler entrances slit 13 in accord with the invention provides at least two important advantages and results not previously achievable in either the systems of Barringer or Harris, or in any other prior art known to applicant. First the concentration of any and all gases having line absorption spectra in the range of sensitivity of the instant system can be observed and measured without the necessity of changing correlation masks or the like. The observation of any and all spectra is performed by merely slowly rotating the diffraction grating as in the wavelength scan of the conventional Jarrell-Ash quarter-meter grating instrument 14 hereinabove set forth. Thus, the instant system permits observation and recording of the concentration of a plurality of pollutant gases without any required changing of the correlation masks of the prior art.

Second, the determination of a pollutant gas concentration is strictly linear function of the signal intensity from the detector of the instant invention. The output signal from detector 17 is a measure of the curvature in the spectral intensity curve expressed as a function of wavelength, and it varies strictly linearly with concentration of the absorbing gas in the radiant energy path, while the output signal from the detector of Barringer or Harris is not a linear function of such concentration. When a prior art multi-slit mask is employed, each different pollutant gas presents a different relation between concentration and signal strength, and when different light sources are used or if different pollutant concentrations are present in the gas being analyzed, different relationships between the concentration and signal strength are encountered. The use of a single wobbling slit in accord with the instant invention produces a signal strength strictly proportional to the pollutant concentration throughout the range of the grating instrument 14. Thus, a single observation of the signal output for a known concentration of gas is all that a person needs in the instant system for calibrating same, for any unknown concentration of that gas, or for any light source that may be used in the instant system, whether the unknown concentration of that gas is present in the absorption cell 16 by itself or with any other pollutant gases in the sample being analyzed. While the Barringer, Harris and the instant invention can all function to determine the presence or absence of a particular gas (if a plurality of correlation masks are used) the Barringer and Harris system do not provide a measure of the concentration of such gas without the use of a calibration curve obtained by use of a plurality of calibration points, or even a comparison of a standard sample for any given measurement, since the relationship between the gas concentration and the output signals is not linearly related; nor is any simple calibration technique known which would provide reasonably accurate concentration readings; i.e., without using a plurality of calibration points to construct a calibration curve for each mask and different gas for each light source used in the Barringer and Harris systems.

Figure 3:
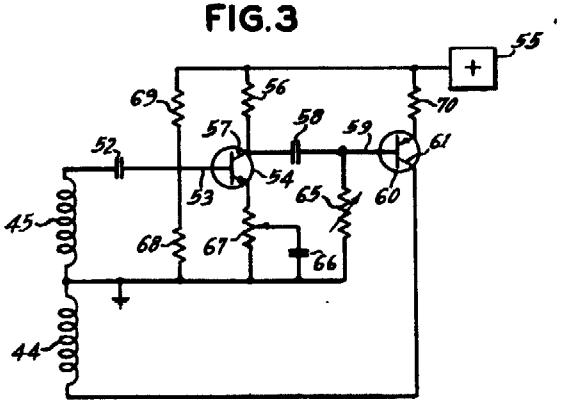
FIG. 3 is a circuit diagram of the wobbler driver for driving the entrance slit of FIG. 2.

An exemplary embodiment of the circuit components of FIG. 3 is seen to include the following parameters;

| | |
|---|---|
| Solenoid coils 44 and 45 | 64 mh |
| Capacitors 52 and 58 | 10 μf |
| 66 | 5 μf |
| Resistors 56 | 18.2K ohms |
| 65 and 68 | 100K ohms |
| 67 | 2K ohms |
| 69 | 464K ohms |
| 70 | 150 ohms |
| Transistors 54 | Fairchild 2N3565 |
| 60 | RCA SK3009 |
| Power Souce 55 | 12 v DC |
| Bar magnet 43 | Alnico |

In the specific embodiment of the invention constructed and tested in accord with the invention, the wobbler slit 36 was displaced approximately 1 millimeter peak to peak with the reciprocation or oscillation frequency being 45 cycles per second. These values are not crictical but have proven to be effective in the functioning and performance of the spectrometer system constructed in accord with the invention herein disclosed.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a spectrometer system including a radiant energy source, a scanning spectrometer, only a single entrance slit disposed between said source and said spectrometer, said source producing a focused radiant energy beam passing through said entrance slit and into said spectrometer, said spectrometer having a single fixed exit slit whereby a radiant energy path is established from said source through said entrance slit and through said spectrometer and out said exit slit, said system including a photomultiplier detector in said radiant energy path aft of and spaced from said exit slit, an absorption cell adapted to contain a medium to be investigated, said cell communicating with said radiant energy path between said exit slit and said detector, said system having no correlation mask corresponding to a medium to be investigated in said cell, the improvement comprising means for movably mounting said entrance slit, said means including means for rectilinearly reciprocating said entrance slit at a constant and rapid frequency to modulate the wavelength of the radiant energy beam detected in a sinusoidal manner.

2. In the system as defined in claim 1 wherein said detector includes a photomultiplier tube having grid wires, said movable entrance slit being located in the radiant energy path between said source and spectrometer whereby radiant energy interference on said grid wire is non-existent.

3. In the system as defined in claim 1 wherein said detector receives the radiant energy after passage through an absorbing medium to be investigated in said cell and converts the received energy into a modulated signal, a tuned phase lock-in amplifier means for receiving said signal and converting said signal into a first signal of selected frequency and a dc signal, said amplifier means being tuned to the same frequency as the frequency at which said entrance slit is reciprocating.

4. In the system as defined in claim 1 wherein said detector receives the radiant energy after passage through an absorbing medium to be investigated in said cell and converts the received energy into a modulated signal, a tuned phase lock-in amplifier means for receiving said signal and converting said signal into a first signal of selected frequency and a dc signal, said amplifier means being tuned to twice the frequency as the frequency at which said entrance slit is reciprocating.

5. In the system as defined in claim 1 wherein said means for rectilinearly reciprocating said entrance slit includes circuit means for maintaining constant the amplitude of the reciprocating motion of said entrance slit.

6. In the system as defined in claim 5 wherein said circuit means includes a selectively adjustable means for altering the amplitude of the reciprocating motion of said entrance slit.

7. In the system as defined in claim 1 wherein said detector receives the radiant energy after passage through an absorbing medium to be investigated in said cell and converts the received radiant energy into a modulated signal, a potentiometric recorder, a tuned phase lock-in amplifier means for receiving said signal and converting said signal into a first signal of selected frequency and a dc signal, said first and dc signals being coupled to said recorder to record the ratio of said first signal to said dc signal.

8. In the system as defined in claim 7 wherein said means for rectilinearly reciprocating said entrance slit includes means for providing a control signal representative of the frequency and phase of the reciprocating motion of said entrance slit to said amplifier for use in rectifying said first signal.

9. In the system as defined in claim 8 wherein said amplifier means is tuned to the same frequency at which said entrance slit is reciprocating.

10. In the system as defined in claim 8 wherein said amplifier means is tuned to twice the frequency at which said entrance slit is reciprocating.

11. In a spectrometer system including a radiant energy source, a spectrometer, only a single entrance slit disposed between said source and said spectrometer, said source producing a focused radiant energy beam passing through said entrance slit and into said spectrometer, said spectrometer having a single fixed exit slit whereby a radiant energy path is established from said source through said entrance slit and through said spectrometer and out said exit slit, said system including a photomultiplier detector, an absorption cell adapted to contain a medium to be investigated, said cell communicating with said radiant energy path between said exit slit and said detector, said detector receiving said radiant energy after passage thereof through said cell and producing an output signal, the improvement comprising means for rectiliearly reciprocating said entrance slit at a constant and rapid frequency to modulate the wavelength of radiant energy beam detected in a sinusoidal manner, a potentiometric recorder for producing a ratio of two signals both derived from said output signal of said detector whereby said ratio is invariant with changes in the intensity of said source.

12. In a spectrometer system including a radiant energy source, a scanning spectrometer, said source producing a focused energy beam passing into said spectrometer, said system including a photomultiplier detector, an absorption cell adapted to contain a medium to be investigated, means for sinusoidally varying the wavelength of the radiant energy beam from said source into said spectrometer at a constant and rapid frequency, said means including a single rectilinearly reciprocating entrance slit between said source and said spectrometer, said sinusoidally varying beam passing from said spectrometer through said absorption cell onto said detector, means to receive the output signal from said detector and provide an indication of the existence and concentration of the medium to be investigated.

*13. In a spectrometer system including a radiant energy source for producing a focused energy beam, a scanning spectrometer having a single entrance slit for receiving the focused energy beam and a single exit slit for passing the radiant energy beam from said spectrometer, said system including a single photomultiplier detector, an absorption cell adapted to contain a medium to be investigated and receiving the radiant energy beam from said spectrometer, said system having no correlation mask corresponding to a medium to be investigated in said cell, means for sinusoidally varying the wavelength of the radiant energy beam from said source into said spectrometer at a constant and rapid frequency, said sinusoidally varying beam passing from said spectrometer through said absorption cell onto said detector and, means to receive the output signal from said detector and provide an indication of the existence and concentration of the medium to be investigated.*

*14. In the system as defined in claim 13 wherein said exit slit is fixed in its location in said system.*

*15. In the system as defined in claim 13 wherein said detector includes a photomultiplier tube having grid wires, said means for generally sinusoidally varying the wavelength of the radiant energy beam being located in the radiant energy path between said source and said exit slit of said spectrometer whereby radiant energy interference on said grid wire is non-existent.*

*16. In the system as defined in claim 13 wherein said detector receives the radiant energy after passage through an absorbing medium to be investigated in said cell and converts the received energy into a modulated signal, a tuned phase lock-in amplifier means for receiving said signal and converting said signal into a first signal of selected frequency and a dc signal, said amplifier means being tuned to said frequency.*

*17. In the system as defined in claim 13 wherein said detector receives the radiant energy after passage through an absorbing medium to be investigated in said cell and converts the received energy into a modulated signal, a tuned phase lock-in amplifier means for receiving said signal and converting said signal into a first signal of selected frequency and a dc signal, said amplifier means being tuned to twice said frequency.*

*18. In the system as defined in claim 13 wherein said means for generally sinusoidally varying the wavelength includes circuit means for maintaining constant the amplitude of the wavelength variation.*

*19. In the system as defined in claim 18 wherein said circuit means includes a selectively adjustable means for altering the amplitude of the wavelength variation.*

*20. The system as defined in claim 13 wherein said detector provides a modulated output signal and wherein said means to receive said output signal from said detector and provide an indication of the existence and concentration of the medium comprises a tuned phase lock-in amplifier means for converting said modulated output signal into an ac signal component and a dc signal component and an indicator responsive to the ratio between said components.*

*21. In the system as defined in claim 20 wherein said means for sinusoidally varying the wavelength includes means for providing a control signal representative of the frequency and phase of the wavelength variation of said amplifier for use in rectifying said first signal.*

*22. In the system as defined in claim 21 wherein said amplifier means is tuned to said frequency.*

*23. In the system as defined in claim 21 wherein said amplifier means is tuned to twice said frequency.*

* * * * *